(12) United States Patent
Naukkarinen

(10) Patent No.: US 8,353,082 B2
(45) Date of Patent: Jan. 15, 2013

(54) METHOD AND APPARATUS FOR A HINGE

(75) Inventor: Samu Naukkarinen, Espoo (FI)

(73) Assignee: Nokia Corporation, Espoo (FI)

( * ) Notice: Subject to any disclaimer, the term of this patent is extended or adjusted under 35 U.S.C. 154(b) by 902 days.

(21) Appl. No.: 12/317,820

(22) Filed: Dec. 29, 2008

(65) Prior Publication Data

US 2010/0162527 A1    Jul. 1, 2010

(51) Int. Cl.
*E05D 7/00*    (2006.01)
(52) U.S. Cl. .......................... 16/354; 16/366
(58) Field of Classification Search ............... 16/244, 16/246, 354, 355–357, 366, 386, 387; 49/149, 49/152, 155, 158, 208, 333, 334, 335, 381; 160/229.1
See application file for complete search history.

(56) References Cited

U.S. PATENT DOCUMENTS

| | | | | |
|---|---|---|---|---|
| 1,673,304 | A * | 6/1928 | Thompson | 16/354 |
| 2,206,739 | A * | 7/1940 | Brogren et al. | 16/354 |
| 4,323,059 | A * | 4/1982 | Rambert et al. | 602/16 |
| 4,960,256 | A * | 10/1990 | Chihara et al. | 248/286.1 |
| 4,979,265 | A * | 12/1990 | Grass | 16/291 |
| 5,060,640 | A * | 10/1991 | Rasmusson | 602/16 |
| 5,168,426 | A * | 12/1992 | Hoving et al. | 361/679.09 |
| 5,363,089 | A * | 11/1994 | Goldenberg | 340/7.63 |
| 5,966,777 | A * | 10/1999 | Jantschek | 16/354 |
| 5,987,704 | A * | 11/1999 | Tang | 16/354 |
| 6,519,812 | B2 * | 2/2003 | Ko et al. | 16/354 |
| 6,900,981 | B2 * | 5/2005 | Kuivas et al. | 361/679.06 |
| 7,140,074 | B2 * | 11/2006 | Han et al. | 16/366 |
| 7,187,538 | B2 * | 3/2007 | Homer et al. | 361/679.21 |
| 7,299,525 | B2 * | 11/2007 | Chang | 16/327 |
| 7,345,872 | B2 * | 3/2008 | Wang | 361/679.55 |
| 7,414,834 | B2 * | 8/2008 | Ukonaho et al. | 361/679.55 |
| 7,418,766 | B2 * | 9/2008 | Nelson et al. | 16/239 |
| 7,426,406 | B2 * | 9/2008 | Maatta et al. | 455/575.8 |
| 7,488,300 | B2 * | 2/2009 | Houser | 602/16 |
| 7,512,426 | B2 * | 3/2009 | Maatta et al. | 455/575.1 |
| 7,832,057 | B2 * | 11/2010 | Hoffman | 16/367 |
| 2005/0122671 | A1 * | 6/2005 | Homer | 361/681 |
| 2005/0155182 | A1 * | 7/2005 | Han et al. | 16/336 |
| 2006/0133052 | A1 | 6/2006 | Harmon et al. | 361/752 |
| 2007/0101541 | A1 | 5/2007 | Ying et al. | 16/221 |
| 2008/0176610 | A1 | 7/2008 | Pan et al. | 455/575.3 |

FOREIGN PATENT DOCUMENTS

| | | |
|---|---|---|
| WO | WO-02063789 A1 | 8/2002 |
| WO | WO-2007069552 A1 | 6/2007 |

\* cited by examiner

*Primary Examiner* — Roberta Delisle
(74) *Attorney, Agent, or Firm* — Harrington & Smith

(57) ABSTRACT

In accordance with an example embodiment of the present invention, there is provided an apparatus including a first body, a second body, and a joint member, the joint member having supported therein a first shaft and a second shaft, the first shaft connected to the first body and the second shaft connected to the second body, wherein the joint member is configured to cause or to allow a change in a separation distance between the first shaft and the second shaft upon a rotational movement of the first body relative to the second body.

20 Claims, 11 Drawing Sheets

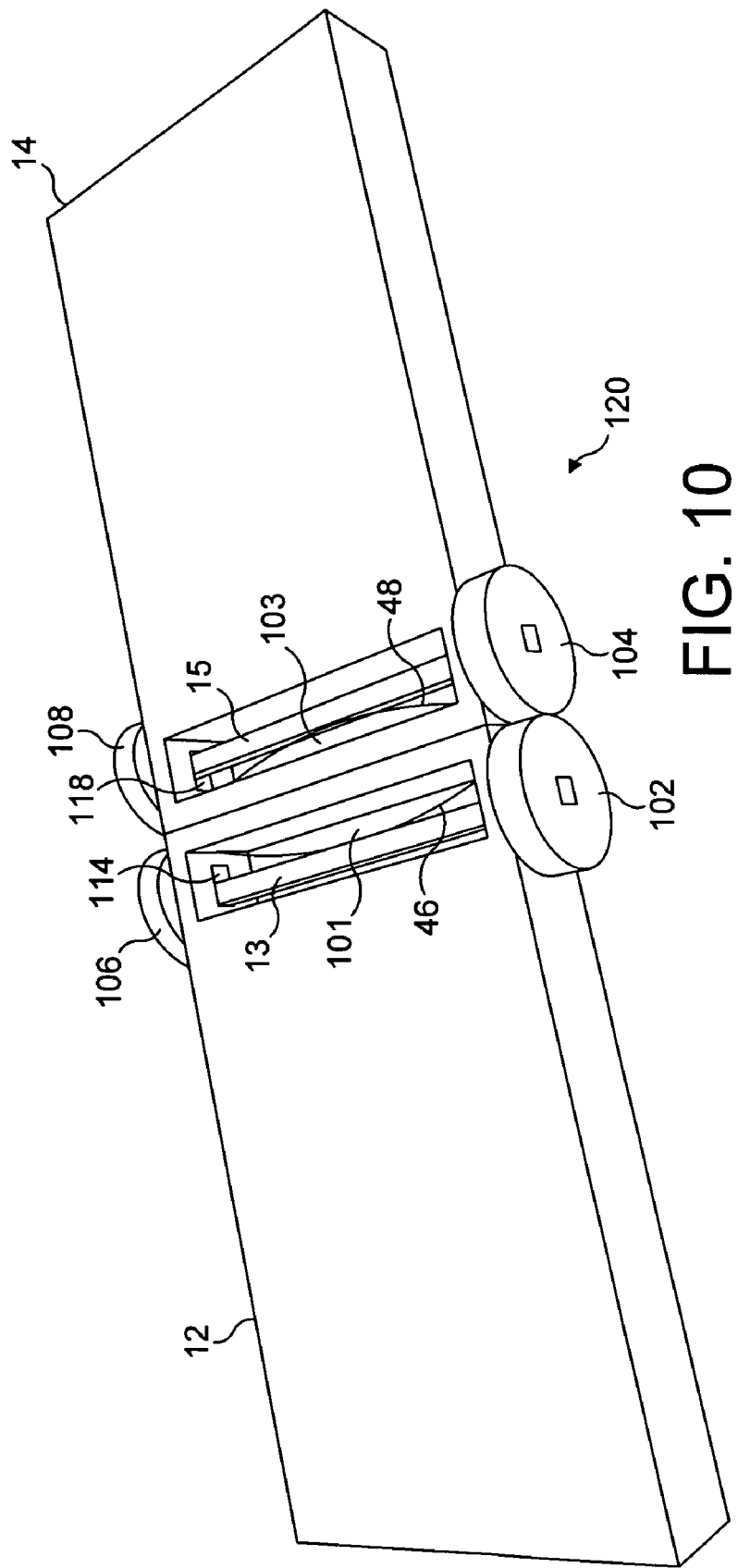

METHOD AND APPARATUS FOR A HINGE

TECHNICAL FIELD

Embodiments relate to a method and apparatus for electronic devices. In particular, they relate to a method and apparatus in an electronic device having a hinge.

BACKGROUND

It is known to provide apparatus, such as portable electronic devices, with two bodies that are connected at a hinge, so as to allow the apparatus to be folded to a compact form when desired.

SUMMARY

Various aspects of examples are set out in the claims and in the description.

According to a first aspect, there is provided an apparatus comprising a first body, a second body, and a joint member, the joint member having supported therein a first shaft and a second shaft, the first shaft connected to the first body and the second shaft connected to the second body, wherein the joint member is configured to cause or to allow a change in a separation distance between the first shaft and the second shaft upon a rotational movement of the first body relative to the second body.

According to a second aspect, there is provided an apparatus comprising a first body, a second body, a joint member, a first shaft secured to the first body, and a second shaft secured to the second body, wherein the first shaft comprises a first end and a second end, and wherein the joint member includes first and second slots, the first end of the first shaft being configured to be slideable within the first slot and the second end of the first shaft being configured to be slideable within the second slot so that the first shaft is able to slide relative to the joint member.

BRIEF DESCRIPTION OF THE DRAWINGS

For a more complete understanding of example embodiments of the present invention, reference is now made to the following descriptions taken in connection with the accompanying drawings in which:

FIG. 10 illustrates a perspective view of various parts of the FIG. 9 apparatus;

DETAILED DESCRIPTION OF THE FIGURES

Figure 1:
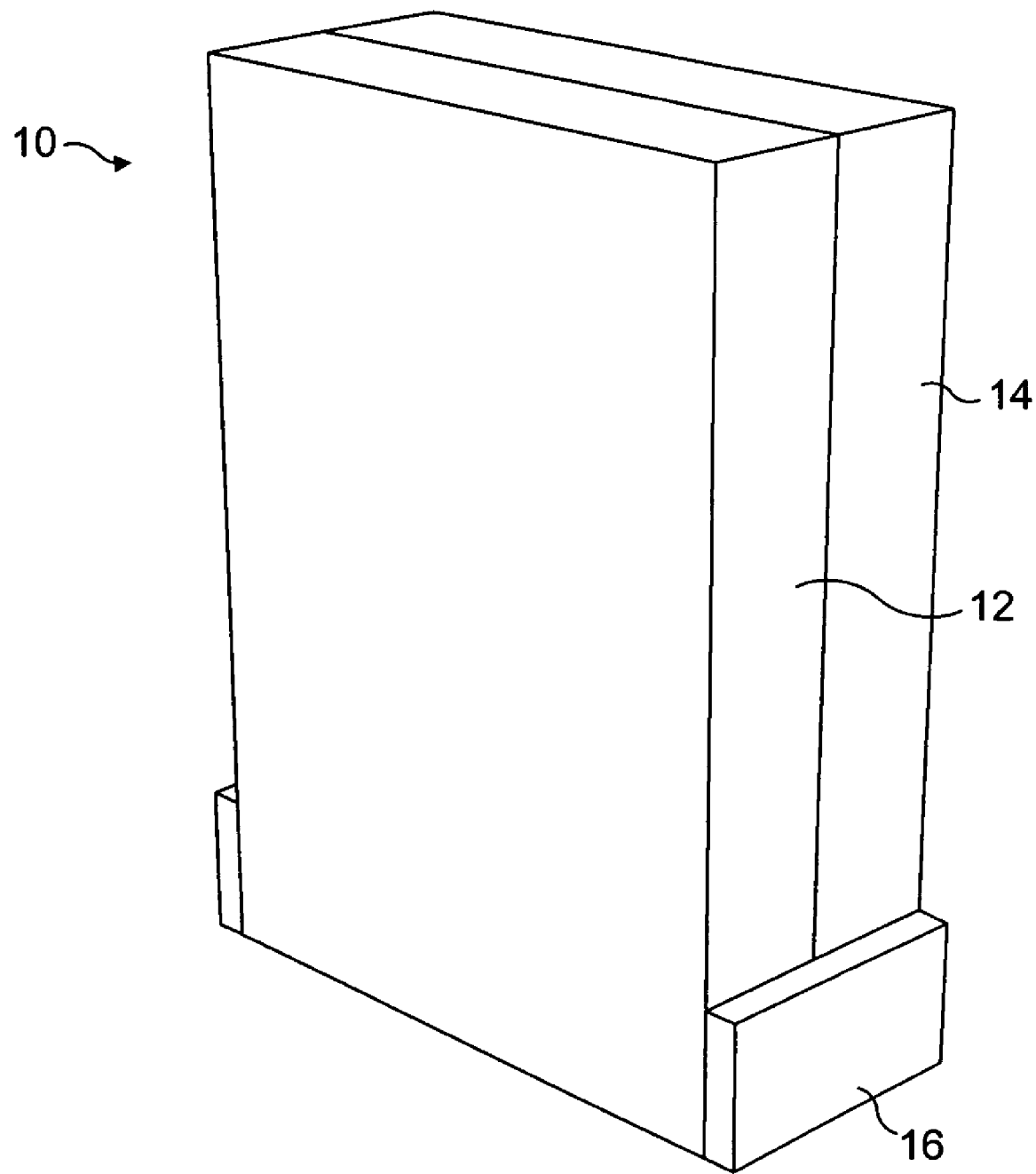
FIG. 1 illustrates a perspective view of an apparatus according to various embodiments.

Example embodiments and its potential advantages are best understood by referring to FIGS. 1 through 10. The present embodiment is directed towards providing a hinge mechanism for an apparatus having first and second bodies that may be biased together in both a first and second configuration so that there is no gap therebetween. Further the hinge mechanism may allow a single large combined surface from the first and second bodies in a second configuration to be formed which may be used to provide a single large combined display. Moreover the mechanism can allow placing other components, such as buttons or other functional modules, near the edge of the bodies. To describe clearly the advantages of the invention, drawings are presented more in schematic form and in variable scales.

FIGS. 1 to 8 illustrate a first example embodiment illustrating an apparatus 10 comprising: a first body 12, a second body 14; and a joint member 16. The joint member has supported therein a first shaft 13 and a second shaft 15. The first shaft 13 is connected to the first body 12. The second shaft 15 is connected to the second body 14. The joint member 16 is configured to cause or to allow a change in a separation distance d between the first body 12 and the second body 14 upon a rotational movement of the first body 12 relative to the second body 14.

Only features referred to in the following description are illustrated. It should, however, be understood that the apparatus 10 may comprise additional features that are not illustrated.

FIG. 1 illustrates a perspective view of an apparatus 10 according to various embodiments. The apparatus 10 includes a joint member 16, a first body 12, a second body 14, a first display 22 (not shown), and a second display 24 (not shown). The apparatus 10 is configured to have a first configuration, in which the joint member 16 closes the first body 12 and the second body 14 of the apparatus 10, such that a first surface 12a (not visible in the figure) of the first body 12 and a first surface 14a (not visible in the figure) of the second body 14 substantially face each other. In this example embodiment of the apparatus 10, the first display 22 and second display 24 are protected from the outside world and therefore may be advantageously protected from damage. The first and second displays 22, 24 may therefore not be exposed to the user in the first configuration.

In the first configuration the apparatus may be in a physical mode normally used for storage, for example, when the apparatus is in a pocket or handbag. The first or second bodies 12, 14 may have at least a third display, different to the first display 22 and the second display 24, on any of the outer surfaces 12b, 12c, 12d, 12e, 12f, 14b, 14c, 14d, 14e, 14f (see FIG. 3) so the user of the apparatus may be able to determine information whilst the apparatus is in the first configuration. The apparatus 10 may be a foldable apparatus, and as such when in the first configuration may normally be considered to be "closed", and therefore in a standby mode.

In the following description, the wording 'connect' and 'couple' and their derivatives mean operationally connected/coupled. It should be appreciated that any number or combination of intervening components can exist (including no intervening elements).

The apparatus 10 may be any electronic device and may be a portable electronic device such as, for example, a mobile cellular telephone, a personal digital assistant (PDA), a laptop computer, a palm top computer, a portable WLAN or WiFi device, or module for such devices. As used here, 'module' refers to a unit or apparatus that excludes certain parts/components that would be added by an end manufacturer or a user.

In the embodiment where the apparatus 10 is a mobile cellular telephone, the first display 22 or the second display 24 may be a touch sensitive display, or any other type of display. The first and second displays 22, 24 may 'combine' to give the impression of a single larger display, to provide the user with an apparatus in which web content, documents or emails are easier to read. In this example, the first and second displays 22, 24 may combine driven by the electronics and software to provide the combined larger display.

Figure 2:
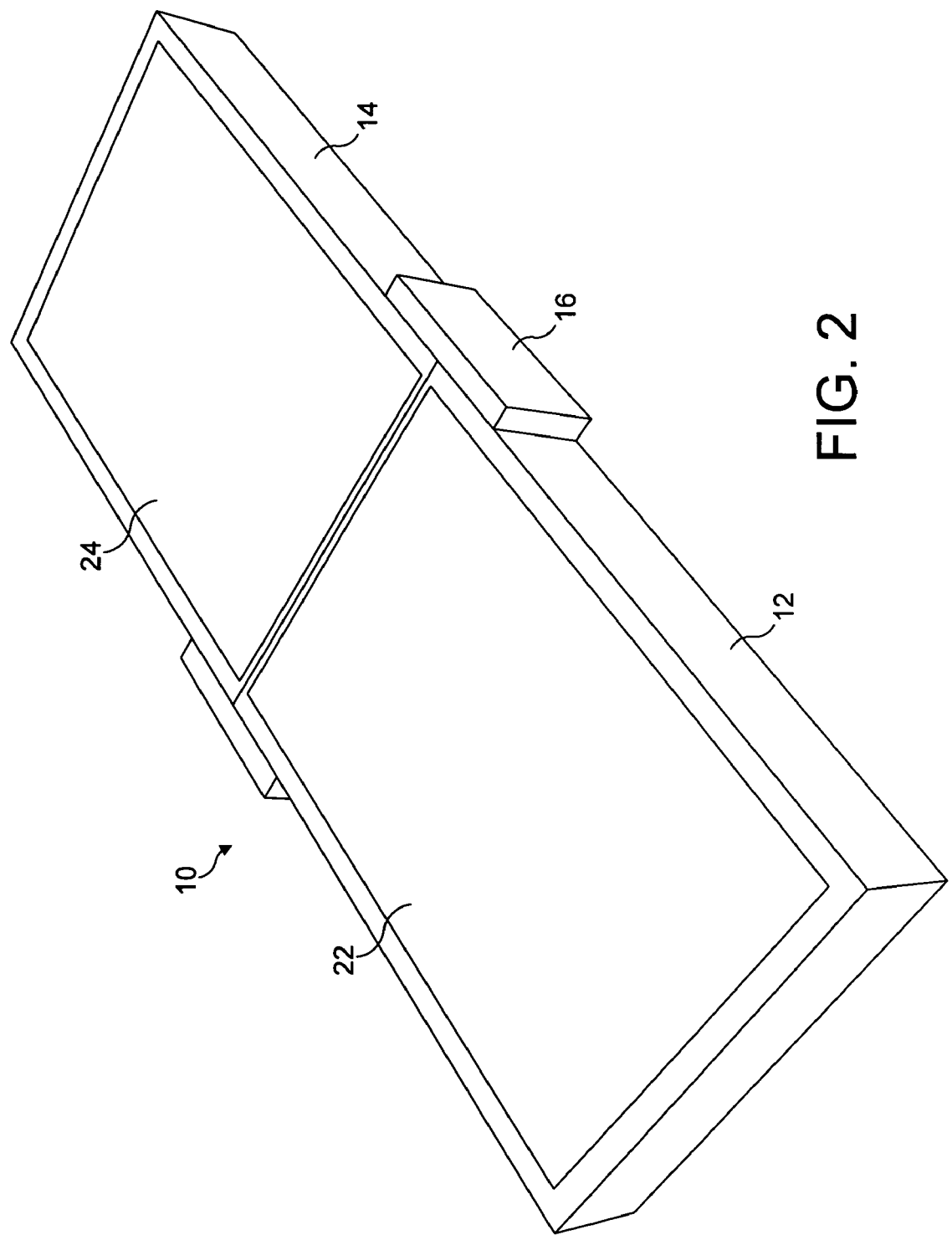
FIG. 2 illustrates a perspective view of the FIG. 1 apparatus.

FIG. 2 illustrates another perspective view of the apparatus 10. In FIG. 2, the apparatus 10 is in a second configuration, the joint member 16 is configured to open the first body 12 and the second body 14 of the apparatus 10.

In the second configuration the apparatus is in a physical mode normally used for usage, for example, when the apparatus may be in a user's hands. In the second configuration a first display 22 may be provided on a first surface 12a of the first body 12, and a second display 24 may be provided on a first surface 14a of the second body 14, the first display 22 and the second display 24 are now both visible to the user on one face of the now opened apparatus 10. The first display 22 and the second display 24 are now substantially co-planar so as to provide the effect of a single, larger, combined display.

The first body 12 and the second body 14 may include other electronic components or features required to produce a workable apparatus 10. For example, the first body 12 or the second body 14 or both, may include a printed wiring board (not shown) that interconnects some, or all, of the electronic components of the apparatus 10.

FIGS. 3a to 3i illustrate a schematic diagram of the apparatus 10. The joint member 16 is shown further to comprise a first shaft 13, a second shaft 15, a first coupler 36, a second coupler 38, a first meshing member 32, and a second meshing member 34.

Figure 3A:
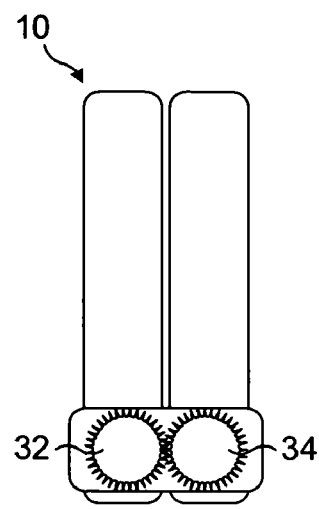
FIGS. 3a to 3i are schematic side views of the FIG. 1 apparatus in different positions.
Figure 3B:
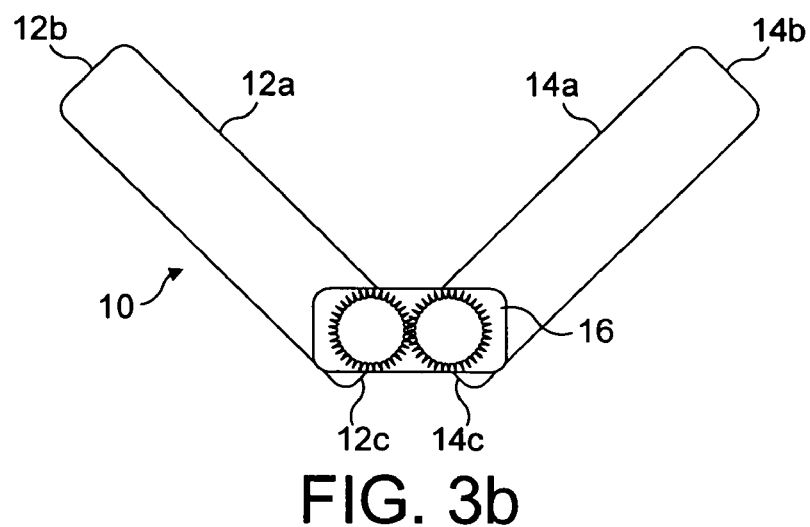
Figure 3C:
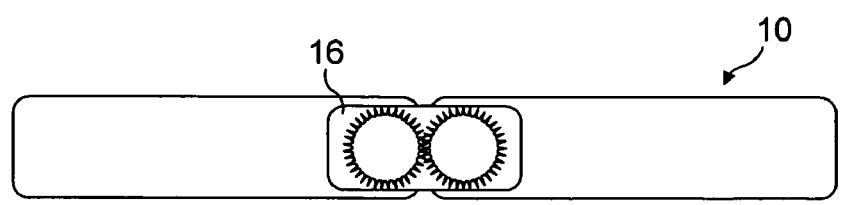
Figure 3D:
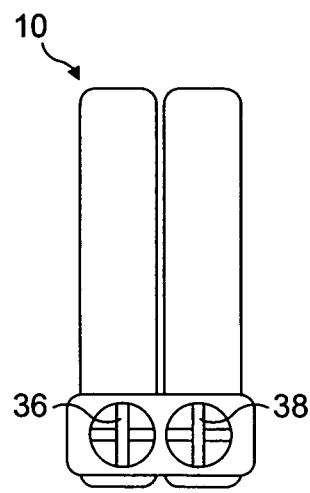
Figure 3E:
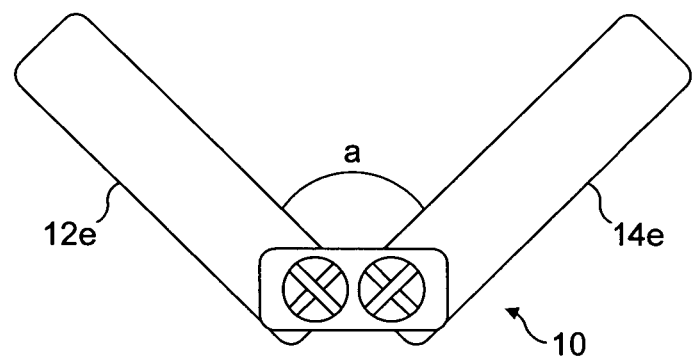
Figure 3F:
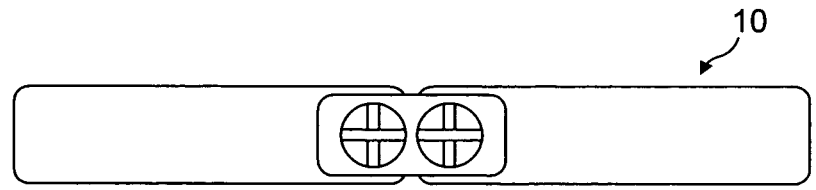
Figure 3G:
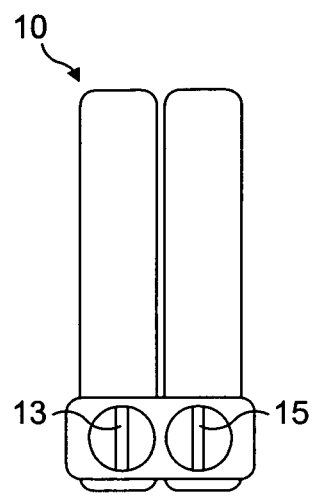

As illustrated in FIGS. 3a, 3d and 3g, the apparatus 10 is configured to have a first configuration, as previously described in FIG. 1.

Figure 3H:
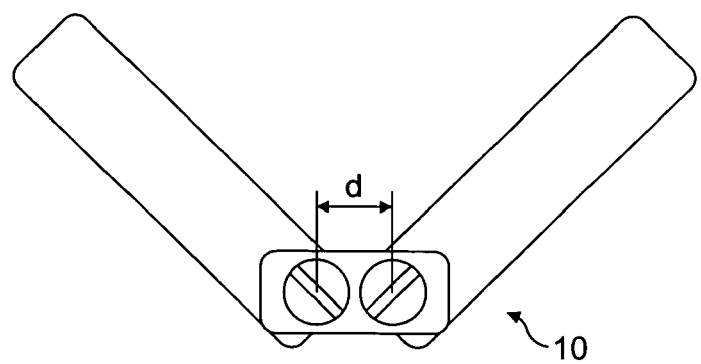

As illustrated in FIGS. 3b, 3e and 3h, the apparatus 10 is configured to have an intermediate configuration. The intermediate configuration is an arbitrary configuration between the first and second configurations.

Figure 3I:
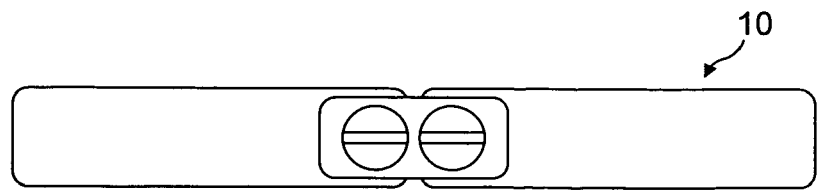

As illustrated in FIGS. 3c, 3f and 3i, the apparatus 10 is configured to have a second configuration, as previously described in FIG. 2.

In FIGS. 3a, 3b and 3c, the first meshing member 32 and the second meshing member 34 are shown in the first, intermediate and second configurations (the other components have been removed for clarity).

In FIGS. 3d, 3e and 3f, the first coupler 36 and the second coupler 38 are shown in the first, intermediate and second configurations (the other components have been removed for clarity).

In FIGS. 3g, 3h and 3i, the first shaft 13 and the second shaft 15 are shown in the first, intermediate and second configurations (the other components have been removed for clarity).

As illustrated in FIG. 3h, the first shaft 13 is separated from the second shaft 15 by a separation distance d. The separation distance d changes during a rotation member 16. The first end 13a of the first shaft 13 is retained in the first slot 62, and the second end 13b of the first shaft 13 is retained in the second slot 64. Although the first shaft 13 is retained at its first and second ends 13a, 13b, the first shaft 13 is free to rotate and slide within the slots 62 and 64. The dimensions and shape of the slots 62 and 64 provide the extent and direction of the travel of the shafts 13 and 15, and hence the first and second bodies 12 and 14.

The first shaft 13 may further comprise a cylindrical section 13c between the first end 13a and the second end 13b,
which provides a contact area for the first biasing member 46 and also a region for connecting the first body 12 to the first shaft 13.

The above description of the first shaft 13 applies equally to the second shaft 15, and so will not be repeated here.

Figure 4A:
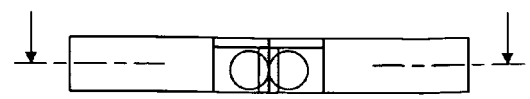
FIGS. 4a to 4c are schematic plan views of the FIG. 1 apparatus.
Figure 4A:
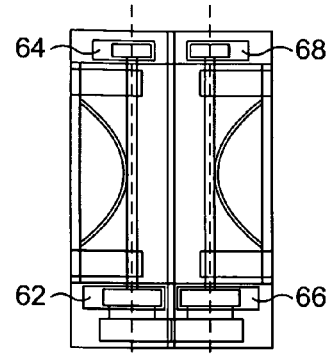
Figure 4B:
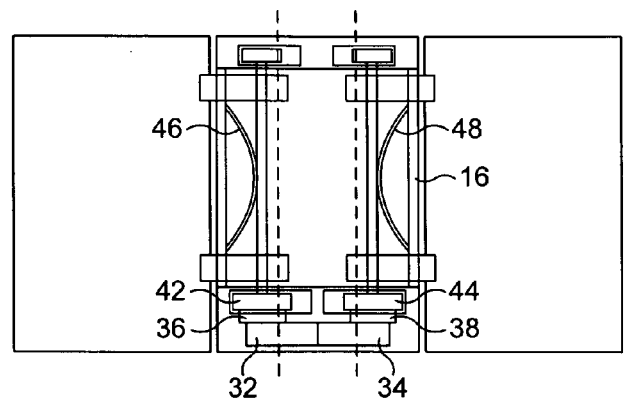

FIG. 4b illustrates an apparatus 10 configured to have an intermediate configuration, in which a first surface 12a of the first body 12 is positioned relative to a first surface 14a of the second body 14, such that the relative position of the first surface 12a of the first body 12 to the first surface 14a of the second body 14 in the intermediate configuration is different from the relative position of the first surface 12a of the first body 12 to the first surface 14a of the second body 14 in the first or second configurations. The first surface 12a of the first body 12 may be considered to be positioned at an angle a relative to the first surface 14a of the second body 14 which is not substantially equal to zero degrees nor is it substantially equal to 180 degrees. As an example, in FIG. 4b, the first surface 12a of the first body 12 is positioned at an angle a of 90 degrees relative to the first surface 14a of the second body 14, but the angle a may be any angle between, and not including substantially zero and 180 degrees in the example.

FIG. 4b illustrates the first biasing member 46 and the second biasing member 48 configured to be compressed during a rotational movement of the first body 12 relative to the second body 14. In FIG. 4b, the biasing members 46, 48 are shown to be compressed as compared to their state in FIGS. 4a and 4c where they are relatively decompressed. FIG. 4b illustrates the relationship between the of the first body 12 relative to the second body 14, as will be described in more detail.

Figure 4C:
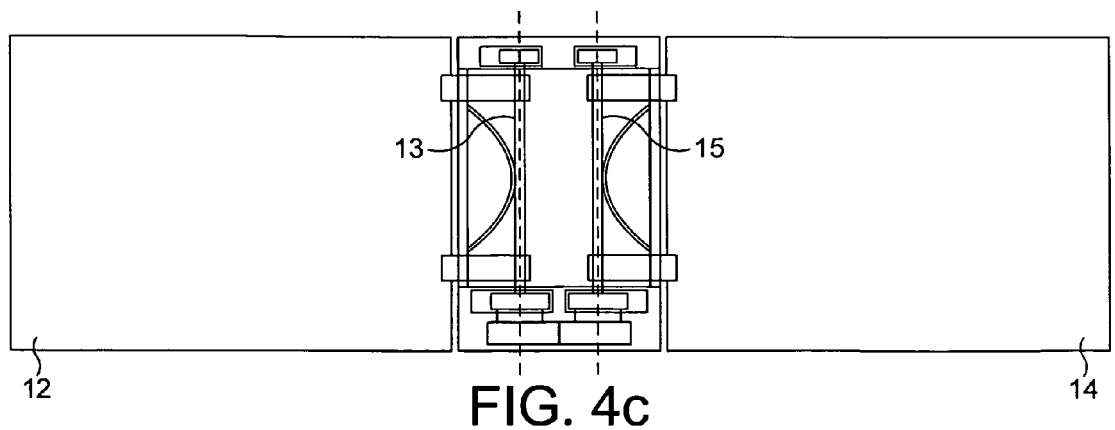

FIGS. 4a to 4c illustrate an alternative schematic diagram of the apparatus 10 in the first, intermediate and second configurations. In FIGS. 4a to 4c, the apparatus 10 is shown to further comprise a first biasing member 46 and a second biasing member 48, which are both located within the joint member 16. The first biasing member 46 is located between the first shaft 13 and a first internal wall of the joint member 16. The second biasing member 48 is located between the second shaft 15 and a second internal wall of the joint member 16. The first and second biasing members 46, 48 are provided to bias the first and second shafts 13, 15, and therefore the first and second bodies 12, 14, together.

FIG. 4a illustrates an apparatus 10 configured to have the first configuration, in which a first surface 12a of the first body 12 is positioned substantially facing a first surface 14a of the second body 14. This may also be referred to as the 'closed position'. In the first configuration the first biasing member 46 biases the first shaft 13 and the second biasing member 48 biases the second shaft 15, so that the first body 12 and second body 14 are pushed together. This first configuration provides a form factor suitable for placing the apparatus 10 in your pocket or in your handbag whilst the apparatus is not in use.

In order for this biasing of the first shaft 13 and the second shaft 15 to take place the joint member 16 may further comprise slots in which the shafts are located. This may be to retain or hold the shafts whilst they are rotated, biased and to provide guidance for the movement allowing the separation distance d to change between the first and second shafts 13, 15.

Figure 5A:
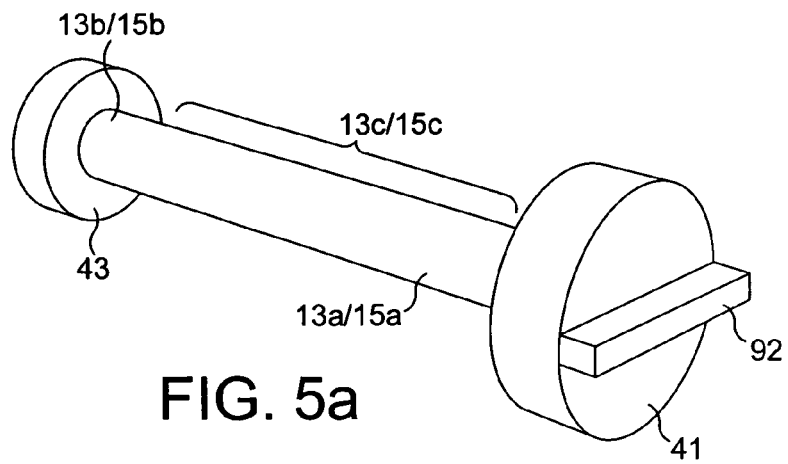
FIGS. 5a to 5c are perspective views of various parts of the FIG. 1 apparatus.
Figure 5B:
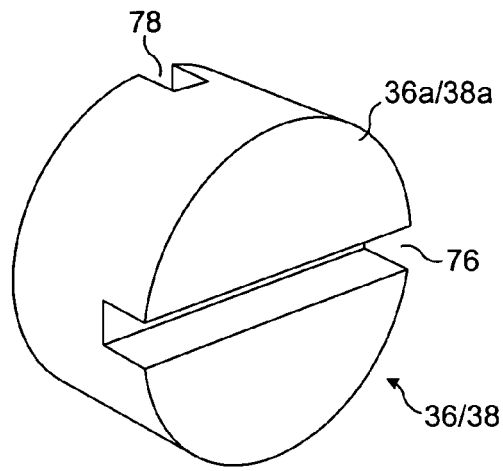
Figure 5C:
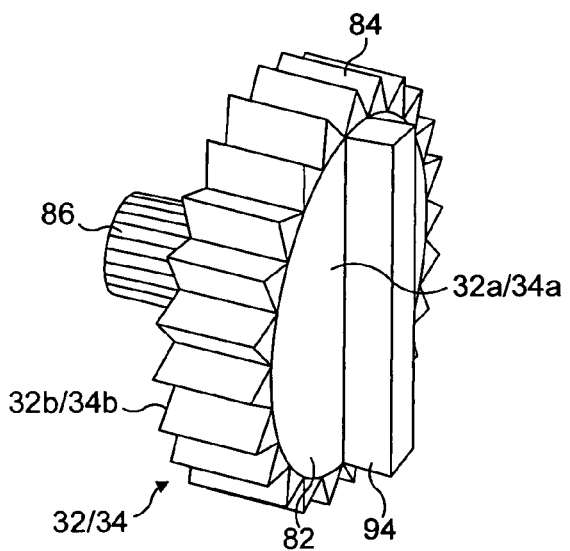

FIGS. 5a to 5c provide further details of some of the parts when used in conjunction with FIGS. 4a to 4c, where for example, the joint member 16 may further comprise a first slot 62 in a first wall 16a of the joint member 16, a second slot 64 in a second wall 16b of the joint member 16, a third slot 66 in the first wall 16a of the joint member 16, and a fourth slot 68 in the second wall 16b of the joint shafts 13, 15 and the biasing members 46, 48 during the transit of the apparatus 10 from the first configuration to the second configuration via the intermediate configuration. In the intermediate configuration a separation distance d between the first shaft 13 and the second shaft 15 increases during the rotational movement of the first body 12 relative to the second body 14. As the separation increases, the biasing force applied to the shafts 13, 15 increases.

FIG. 4c illustrates the apparatus 10 configured to have the second configuration, as previously described above with reference to FIG. 2. The first surface 12a of the first body 12 is positioned substantially co-planar with the first surface 14a of the second body 14. This may also be referred to as the 'open position'. In the second configuration, the first body 12 and the second body 14 are biased together by the biasing members 46, 48, and upon the rotational movement of the bodies 12, 14, causing the movement of the shafts 13, 15 relative to the joint member 16. The first biasing member 46 is in this configuration less compressed but pushing against the first shaft 13, which in turn is connected to the first body 12. At the same time, and due to the synchronous connection via the first meshing member 32 and the second meshing member 34, the second biasing member 48 is also now less compressed but pushing against the second shaft 15, which in turn is connected to the second body 14.

FIGS. 5a to 5c illustrate some of the aforementioned example components of the joint member 16.

FIG. 5a illustrates a perspective view of a first or second shaft 13, 15.

FIG. 5b illustrates a perspective view of a first or second coupler 36, 38.

FIG. 5c illustrates a perspective view of a first or second meshing member 32, 34.

As already discussed above, the joint member 16 comprises a first shaft 13 and a second shaft 15, and as they are the same we shall describe only the first shaft 13 here for the sake of clarity and conciseness.

The first shaft 13 may comprise a first disc 41 at a first end 13a. The first disc 41 has a diameter larger than the diameter of the cylindrical section 13c. This provides suitable contact area and force when the first disc 41 is used to turn with the first coupler 36. The first disc 41 further comprises a protrusion 92 which is rectangular in shape and is formed so as to become a key which may be inserted into the second diametric slot 78 of the first coupler 36, as shown in FIG. 5a. The protrusion 92 connects the first shaft 13 to the first coupler 36 to form part of the joint member 16. The protrusion 92 may extend across the full diameter of the first disc 41.

Figure 7:
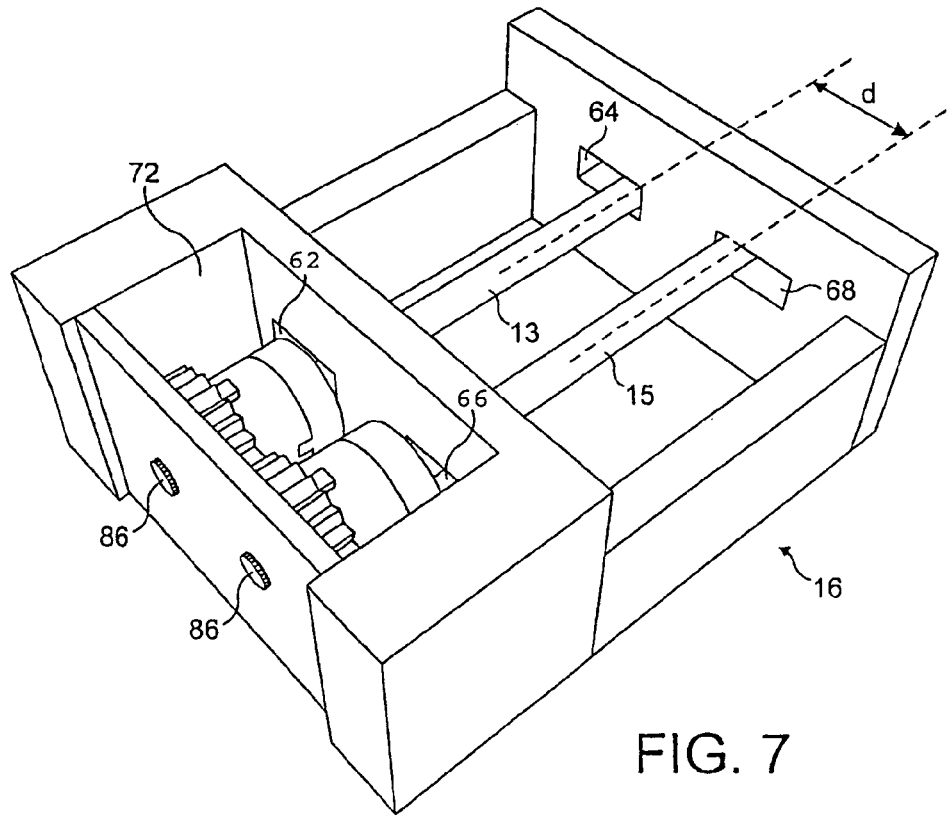
FIG. 7 is a perspective view of an assembly of the FIG. 1 apparatus.
Figure 8:
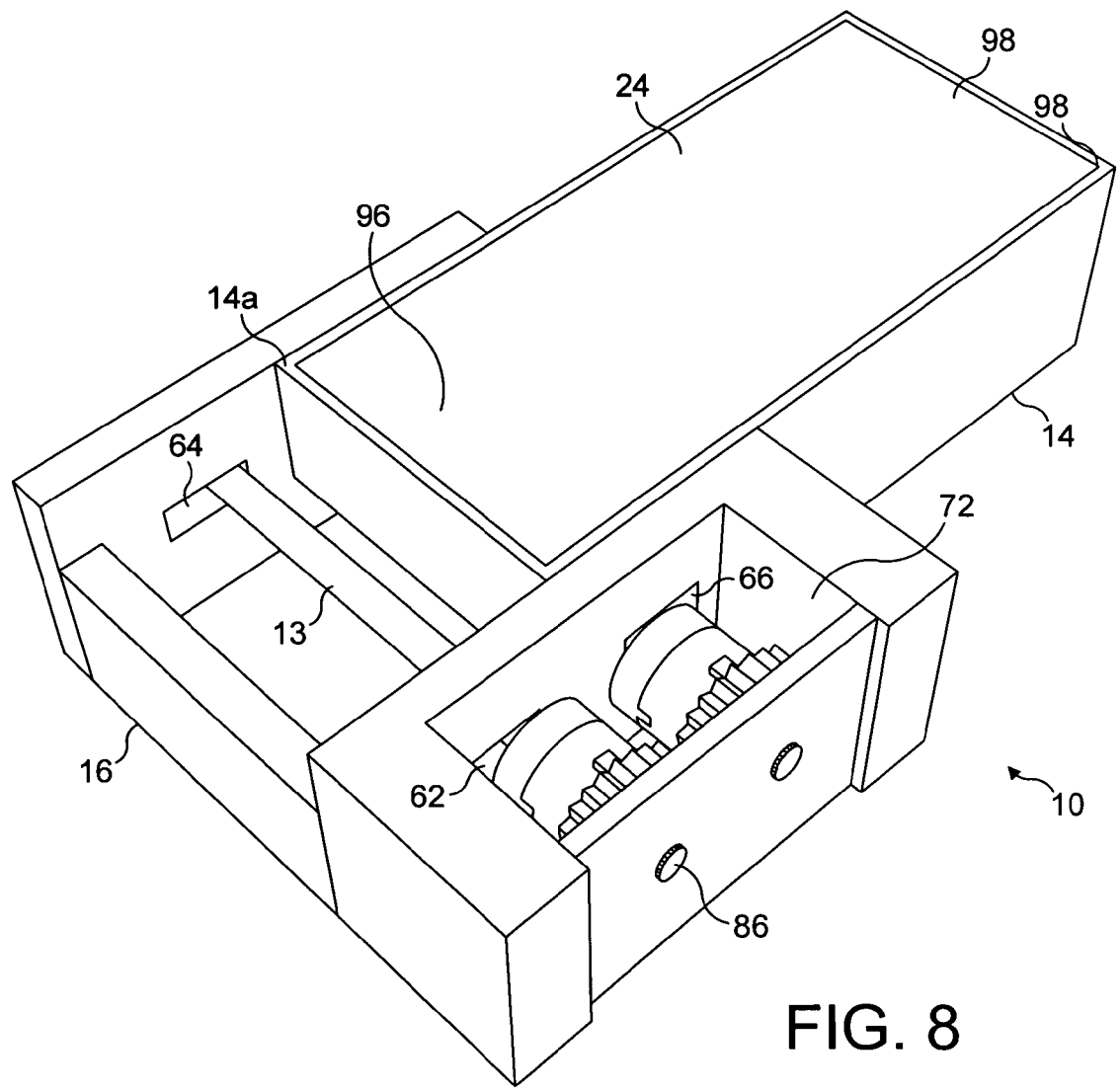
FIG. 8 is a different perspective view of the FIG. 1 apparatus.

As illustrated in FIGS. 7 and 8 the first disc 41 of the first shaft 13 may be positioned within a first recess 72 in a wall of the joint member 16 to provide the required volumetric space for the movement of the first shaft 13, and the first coupler 36 during a rotational movement of the first and second bodies 12, 14. At least a part of the cylindrical section 13c at the first end 13a of the first shaft 13 may also be positioned in a first slot 62 in a wall of the joint member 16, as previously mentioned.

The first shaft 13 may further comprise a second disc 43 at a second end 13b, which has a diameter larger than the diameter of the cylindrical section 13c. The second disc 43 provides a physical feature at the second end 13b of the first shaft 13 so that the second end 13b may be retained in a second slot 64 in a wall of the joint member 16. This provides retention of the first shaft 13 at its second end 13b, whilst allowing rotational and sliding movement of the shaft 13. Hence, disc 43 at the end of shaft 13b may prevent rotation of the shaft in an unwanted axis relative to the bodies 12 and 14.

FIG. 5b illustrates a perspective view of the first or second coupler 36, 38 in more detail. If we consider only the first coupler 36, the first coupler 36 comprises a first diametric slot 76 on a first face 36a, and a second diametric slot 78 on a second face 36b. The first face 36a is substantially parallel to the second face 36b and the first and second faces 36a, 36b may be substantially planar. The second diametric slot 78 is positioned orthogonally relative to the first diametric slot 76 on the first face 36a. This is to allow the first coupler 36 to move in more than one direction, for example, the first coupler 36 may move in a first direction and also in a second direction different to the first direction. This may allow the first coupler 36 to move in two directions simultaneously so that it may move not only left and right, but also up and down, and also diagonally, or in any direction within the two dimensional space it is allowed to move in, as provided by the first recess 72. The first coupler 36 being physically held between the first shaft 13 and the first meshing member 32 transfers the movement of the first shaft 13 to the first meshing member 32. The first coupler 36 enables the rotational movement of the first shaft (and therefore the first body 12) to be linked to the sliding movement provided by a slot or recess in the wall of the joint member 16.

FIG. 5c illustrates a perspective view of a first meshing member 32 or a second meshing member 34. In order to maintain clarity we will only describe the first meshing member 32 here, as the first meshing member 32 and the second meshing member 34 have the same features.

The first meshing member 32 comprises a cylindrical body 82, a protrusion 94 located on a first face 32a of the cylindrical body 82, a pivot 86 located on a second face 32b of the cylindrical body 82, and circumferential teeth 84 located around the circumference of the cylindrical body 82. The first meshing member 32 is configured to rotate about a fixed axis as provided by the pivot 86. The teeth 84 are configured to drive the teeth 84 of the second meshing member 34, so as to provide synchronous rotational movement of the first body 12 and the second body 14.

The protrusion 94 is configured to locate in the first diametric slot 76 of the first coupler 36, so that the rotational movement of the first body 12, via the first shaft 13, is transmitted to the first meshing member 32, which in turn further drives the rotation of the second meshing member 34. Due to the connection between the first and second meshing members, the first and second bodies 12, 14 are synchronously connected. The coupling of meshing member 32 to meshing member 34 enables the first body 12 and the second body 14 of the apparatus 10 to be synchronously coupled together during the rotation from the first configuration to the second configuration. The first and second meshing members 32, 34 are positioned together in the joint member 16, such that a distance between the axes of rotation of the first and second meshing members is fixed.

It will be appreciated that the first and second meshing members 32, 34 may be any shape, they may be for example semi-circular.

Figure 6:
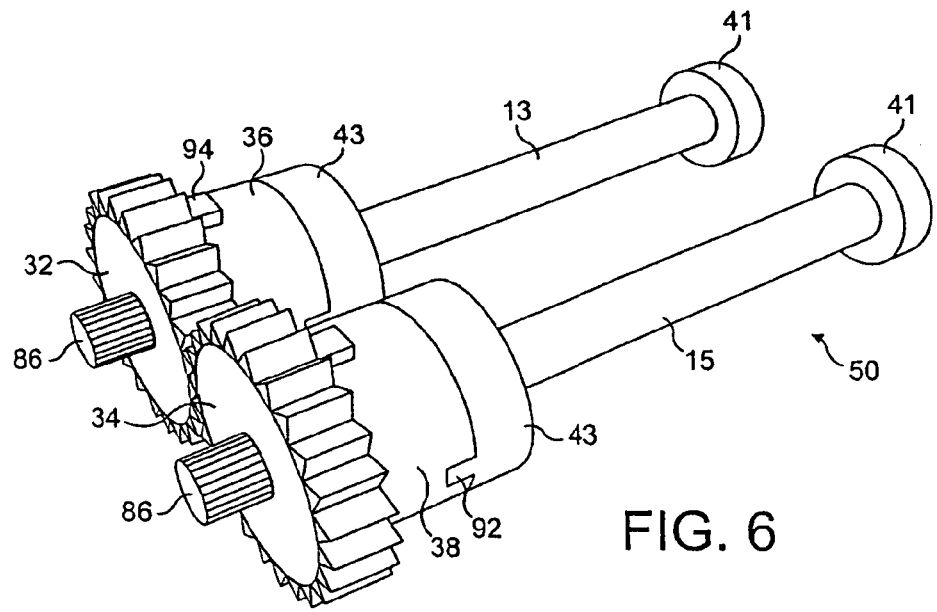
FIG. 6 is a perspective view of parts of the assembly of the FIG. 1 apparatus.

FIG. 6 illustrates another perspective view of various parts of the joint member 16.

The assembly 50 is similar to that of a known mechanism, the Oldham Coupler, however, in the Oldham Coupler the input shafts (represented by the meshing members 32, 34 in this embodiment) and output shafts (represented by the shafts 13, 15 in this embodiment) are offset from one another, and at fixed axes. In this first example embodiment the meshing members 32, 34 are rotated on fixed axes or centres of rotation, whereas the first and second shafts 13, 15 rotate on sliding centres or axes.

The assembly 50 illustrates how the first shaft 13 is connected to the first coupler 36, and how the first coupler 36 is connected to the first meshing member 32. Further the assembly 50 then illustrates how the teeth 84 of the first meshing member 32 connect to the teeth 84 of the second meshing member 34, and how the second meshing member 34 then connects to the second coupler 38, which in turn connects to the second shaft 15.

FIG. 7 illustrates another perspective view of various parts of the joint member 16 according to a first embodiment. The first shaft 13 is positioned substantially parallel to the second shaft 15 at a separation distance d. The separation distance d may be changed during a movement of the first body 12 and the second body 14 of the apparatus 10. As previously described this may allow the apparatus 10 to rotate freely from the closed position or first configuration to the open position or second configuration, as the first body 12 and the second body 14 are kept apart during the intermediate configuration. When the apparatus 10 is configured to have a first or second configuration, the first and second biasing members 46, 48 bias the first body 12 and the second body 14 together so they may make contact with one another.

FIG. 8 illustrates another perspective view of various parts of the apparatus 10 according to a first embodiment. The apparatus 10 comprises a second body 14, and a joint member 16 further comprising a first shaft 13, a second shaft 15, a first meshing member 32, a second meshing member 34, a first coupler 36, and a second coupler 38. The first biasing member 46, the second biasing member 48, and the first body 12 are removed for clarity.

As illustrated in FIG. 8 the apparatus 10 is configured to have a second body 14 positioned relative to the joint member 16 such that the second shaft 15 connects to a first end 96 of the second body 14. It will be appreciated by the skilled person that the shape of the joint member 16 and the shape of the second body 14 may be changed to any shape which may suit the physical interaction between the two parts. The joint member 16 is configured to cause or to allow a change in a separation distance d between the first shaft 13 and the second shaft 15 upon a rotational movement of the first body 12 (not shown) relative to the second body 14. In this example, the joint member 16 is configured to have four slots 62, 64, 66 and 68 which are substantially rectangular and therefore direct the first body 12 and the second body 14 along a straight path, but in opposite directions to one another.

FIGS. 9 to 11 illustrate other example embodiment illustrating an apparatus 10 comprising: a first body 12, a second body 14; and a joint member 16, the joint member having supported therein a first shaft 13 and a second shaft 15, the first shaft 13 connected to the first body 12 and the second shaft 15 connected to the second body 14, wherein the joint member 16 is configured to cause or to allow a change in a separation distance d between the first body 12 and the second body 14 upon a rotational movement of the first body 12 relative to the second body 14.

Only features referred to in the following description are illustrated. It should, however, be understood that the apparatus 10 may comprise additional features that are not illustrated.

Figure 9A:
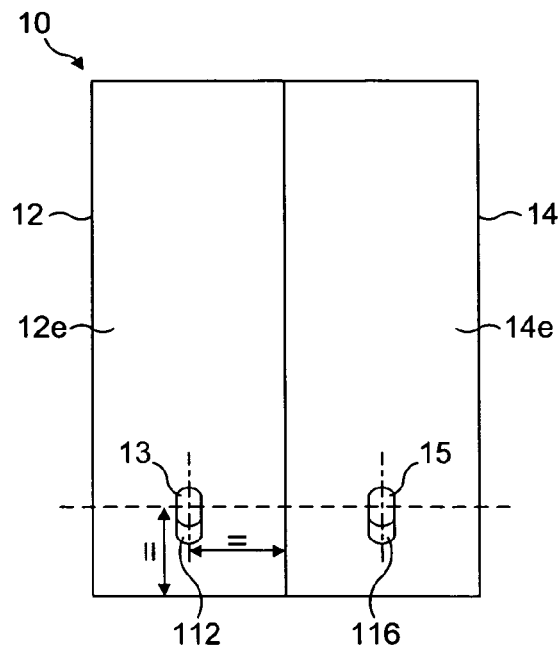
FIGS. 9a to 9c are schematic diagrams of an apparatus according to other embodiments.
Figure 9B:
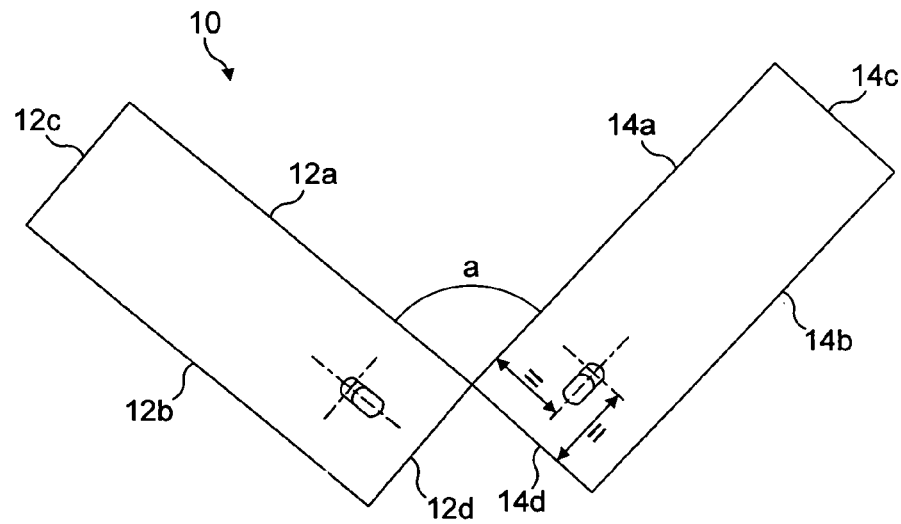
Figure 9C:
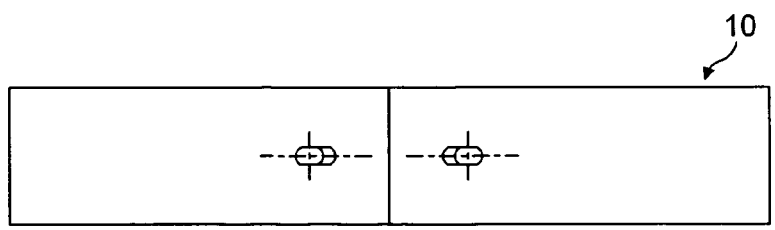

FIGS. 9a to 9c illustrate a schematic diagram of an apparatus according to a second embodiment. In FIG. 9a, the apparatus is configured to have a first configuration. In FIG. 9b, the apparatus is configured to have an intermediate configuration. In FIG. 9c, the apparatus is configured to have a second configuration.

As illustrated in FIG. 9a, an apparatus 10 is configured to have a first configuration, in which a first surface 12a of the first body 12 is positioned substantially facing a first surface 14a of the second body 14. This may also be referred to as the 'closed position'. In the first configuration the first biasing member 46 (not shown) biases the first shaft 13 and the second biasing member 48 (not shown) biases the second shaft 15, so that the first body 12 and second body 14 are biased together. This first configuration may provide a form factor suitable for placing the apparatus 10 in your pocket or in your handbag whilst the apparatus is not in use.

As illustrated in FIG. 9b, an apparatus 10 is configured to have an intermediate configuration, in which a first surface 12a of the first body 12 is positioned relative to a first surface 14a of the second body 14, such that the relative position of the first surface 12a of the first body 12 to the first surface 14a of the second body 14 in the intermediate configuration is different from the relative position of the first surface 12a of the first body 12 to the first surface 14a of the second body 14 in the first or second configurations. The first surface 12a of the first body 12 may be considered to be positioned at an angle a relative to the first surface 14a of the second body 14 which is not substantially equal to zero degrees nor is it substantially equal to 180 degrees. As an example, in FIG. 9b, the first surface 12a of the first body 12 is positioned at an angle a of 90 degrees relative to the first surface 14a of the second body 14, but the angle a may be any angle between, and not including substantially zero and 180 degrees in the example.

The first biasing member 46 (not shown) and the second biasing member 48 (not shown) are configured to be compressed during a rotational movement of the first body 12 relative to the second body 14. When the apparatus 10 is configured to have the intermediate configuration the biasing members 46, 48 are squashed or compressed relative to their state in either the first configuration or the second configuration, where they are relatively decompressed. In the intermediate configuration a separation distance d between the first body 12 and the second body 14 increases during the rotational movement of the first body 12 relative to the second body 14.

FIG. 9c illustrates the apparatus 10 configured to have the second configuration, as previously described above with reference to FIG. 2, in which a first surface 12a of the first body 12 is positioned substantially co-planar with a first surface 14a of the second body 14. This may also be referred to as the 'open position'.

FIG. 10 illustrates a perspective view of various parts of an apparatus according to the second embodiment. The assembly 120 comprises: a first body 12, a second body 14, a first shaft 13, a second shaft 15, a first meshing member 102, a second meshing member 104, a third meshing member 106, a fourth meshing member 108, a first biasing member 46, a second biasing member 48, a first slot 112 (not shown), a second slot 114, a third slot 116 (not shown) and a fourth slot 118. The joint member 16 is removed from FIG. 10 for clarity.

In this figure, the first body 12 further comprises a first recess 101, and the second body 14 further comprises a second recess 103. The first body may further comprise a first display 22 (not shown), and the second body 14 may further comprise a second display 24 (not shown) or any other electronic component or module, for example, an input device or a cover. Although the first body 12 comprises a first recess 101, which shows the workings of the first shaft 13 and the first biasing member 46, and other components in FIG. 10, this would normally be covered by another component, for example, a first display 22 or a feature of the first body 12. Similarly, although the second body 14 comprises a second recess 103, which shows the workings of the second shaft 15 and the second biasing member 48, and other components in FIG. 10, this would normally be covered by another component, for example, a second display 24 or a feature of the second body 14.

Although the first, second, third and fourth meshing members 102, 104, 106, and 108 are shown in FIG. 10 having a circular shape, the shape may be any shape which allows a change in a separation distance d between the first body 12 and the second body 14 upon a rotational movement of the first body 12 relative to the second body 14. For example, the first, second, third and fourth meshing members 102, 104, 106, and 108 may have a non-circular shape, so that they operate like cams. If we consider only the action of the first meshing member 102 and the second meshing member 104, when the first body 12 is rotated relative to the second body 14, because the shape of the first meshing member 102 is non-circular, and the shape of the second meshing member 104 is non-circular, the first body 12 and the second body 14 will move apart in a direction determined by the shape and length of the first slot 112, second slot 114, third slot 116 and fourth slot 118.

The first meshing member 102 is dimensioned so as to mesh with the second meshing member 104 at a meshing point having a distance from a rotational axis of the first meshing member 102 that varies at different points on a perimeter of the first meshing member 102, such that a distance between the rotational axis of the first meshing member 102 and the meshing point changes as the first meshing member 102 and the second meshing member 104 rotate with respect to one another.

The apparatus may provide a first surface of the first body to be substantially facing a first surface of the second body when in a first configuration, and a first surface of the first body to be substantially co-planar with a first surface of the second body in a second configuration. In this way the apparatus may provide a hinge mechanism which folds two body parts of the apparatus. The first configuration can represent the apparatus being folded to a closed position, and the second configuration can represent the apparatus being unfolded to an open position.

The apparatus may provide benefits such that the two body parts may be touching one another when in the first and second configurations. The apparatus may provide a first display on a first surface of a first body to be substantially facing a second display on a first surface of a second body, and therefore adjacent one another without any gap therebetween in the first configuration. The apparatus may provide the further benefit that the two displays may be protected whilst the apparatus is in the closed or first configuration.

Equally the apparatus may provide a first display on a first surface of the first body and a second display on a first surface of the second body to be substantially co-planar and therefore adjacent one another without any gap therebetween in the second configuration. In the second configuration, for example, it will be a benefit to have the two displays adjacent one another to provide a combined single larger display which may make it easier for the user of the apparatus to read emails and browse web content. The apparatus may provide the benefit that component parts, for example, displays and the like may be placed very close to the hinge mechanism and therefore provide very close placement of these components when in a first or second configuration.

The apparatus may further provide a first body and a second body which may be configured to slide relative to the joint member during at least a part of the rotational movement. This may provide the benefit that the first and second bodies do not touch one another during the rotation of the two bodies.

The apparatus may also comprise at least one biasing member, the at least one biasing member being configured to bias the first body and the second body together. This may provide the benefit that the first and second bodies are biased together in the first and second configurations, thereby providing a zero or relatively small gap as discussed above.

The joint member may comprise first and second meshing members, a first coupler may be configured to transmit rotary motion of the first shaft to rotary motion of the first meshing member, an axis of rotation of the first shaft being movable with respect to an axis of rotation of the first meshing member, and a second coupler may be configured to transmit rotary motion of the second shaft to rotary motion of the second meshing member, an axis of rotation of the second shaft being movable with respect to an axis of rotation of the second meshing member, wherein the first and second meshing members are secured together such that a distance between the axes of rotation of the first and second meshing members is fixed. The joint member may therefore provide the benefit that the axes of the first and second shafts move relative to the fixed axes of the meshing members. As the shafts are connected to their respective bodies, therefore the bodies may also move relative to the fixed axes of the meshing members. The apparatus may comprise first and/or second couplers which are Oldham couplers.

Without in any way limiting the scope, interpretation, or application of the claims appearing below, it is possible that a technical effect of one or more of the example embodiments disclosed herein may be the provision of bodies that can be made to abut one another closely in different configurations.

If desired, the different functions discussed herein may be performed in a different order and/or concurrently with each other. Furthermore, if desired, one or more of the above-described functions may be optional or may be combined.

Although various aspects are set out in the independent claims, other aspects comprise any combination of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims and its equivalents.

What is claimed is:

1. An apparatus comprising:
   a first body;
   a second body; and
   a joint member, the joint member having supported therein a first shaft and a second shaft, the first shaft connected to the first body and the second shaft connected to the second body,
   wherein the joint member is configured to cause or to allow a change in a separation distance between the first shaft and the second shaft upon a rotational movement of the first body relative to the second body;
   and further wherein the joint member comprises at least one biasing member, the at least one biasing member being configured to bias the first body and the second body together.

2. An apparatus according to claim 1, wherein a first surface of the first body is positioned substantially facing a first surface of the second body when the apparatus is in a first configuration, and the first surface of the first body is positioned substantially co-planar with the first surface of the second body when the apparatus is in a second configuration.

3. An apparatus according to claim 2, wherein the first body comprises a first display and the second body comprises an input device, and the first body and second body provide a single co-planar body when the apparatus is in the second configuration.

4. An apparatus according to claim 2, wherein the first body comprises a first display and a first input device and the second body comprises a second display and a second input device, and the first body and second body provide a single co-planar body when the apparatus is in the second configuration.

5. An apparatus according to claim 2, wherein the first body comprises a first display and the second body comprises a second display, and the first body and second body combine to provide a combined display in a second position.

6. An apparatus according to claim 1, wherein each of the first body and the second body is configured to slide relative to the joint member during at least a part of the rotational movement.

7. An apparatus according to claim 1, wherein the joint member comprises:
first and second meshing members;
a first coupler configured to transmit rotary motion of the first shaft to rotary motion of the first meshing member, an axis of rotation of the first shaft being movable with respect to an axis of rotation of the first meshing member; and
a second coupler configured to transmit rotary motion of the second shaft to rotary motion of the second meshing member, an axis of rotation of the second shaft being movable with respect to an axis of rotation of the second meshing member,
wherein the first and second meshing members are secured together such that a distance between the axes of rotation of the first and second meshing members is fixed.

8. An apparatus as claimed in claim 7, wherein either or both of the first and second couplers is an Oldham coupler.

9. An apparatus according to claim 7, wherein the first meshing member is connected to the first coupler, the second meshing member is connected to the second coupler, and the first meshing member is synchronously connected to the second meshing member, wherein the first and second meshing members are configured to connect the first body to the second body.

10. An apparatus as claimed in claims 7, wherein the first and second meshing members are toothed meshing members.

11. An apparatus according to claims 1, wherein the joint member comprises:
a first meshing member; and
a second meshing member configured to mesh with the first meshing member;
the first meshing member being configured to rotate with the first shaft, an axis of rotation of the first meshing member being in a fixed relationship with respect to an axis of rotation of the first shaft,
the second meshing member being configured to rotate with the second shaft, an axis of rotation of the second meshing member being in a fixed relationship with respect to an axis of rotation of the second shaft,
wherein the first and second meshing members are configured such that a distance between the rotational axes of the first and second meshing members changes as the first and second meshing members rotate with respect to one another.

12. An apparatus as claimed in claim 11, wherein the first meshing member is dimensioned so as to mesh with the second meshing member at a meshing point having a distance from a rotational axis of the first meshing member that varies at different points on a perimeter of the first meshing member, such that a distance between the rotational axis of the first meshing member and the meshing point changes as the first and second meshing members rotate with respect to one another.

13. An apparatus as claimed in claim 11, wherein the first and second meshing members are toothed meshing members.

14. A portable electronic device comprising an apparatus as claimed in claim 1.

15. An apparatus comprising:
a first body;
a second body;
a joint member;
a first shaft secured to the first body; and
a second shaft secured to the second body,
wherein the first shaft comprises a first end and a second end, and wherein the joint member includes first and second slots, the first end of the first shaft being configured to be slideable within the first slot and the second end of the first shaft being configured to be slideable within the second slot so that the first shaft is able to slide relative to the joint member.

16. An apparatus according to claim 15, wherein a first surface of the first body is positioned substantially facing a first surface of the second body when the apparatus is in a first configuration, and the first surface of the first body is positioned substantially co-planar with the first surface of the second body when the apparatus is in a second configuration.

17. An apparatus according to claim 16, wherein the first body comprises a first display and the second body comprises an input device, and the first body and second body provide a single co-planar body when the apparatus is in the second configuration.

18. An apparatus according to claim 16, wherein the first body comprises a first display and a first input device and the second body comprises a second display and a second input device, and the first body and second body provide a single co-planar body when the apparatus is in the second configuration.

19. An apparatus according to claim 16, wherein the first body comprises a first display and the second body comprises a second display, and the first body and second body combine to provide a combined display in a second position.

20. An apparatus according to claim 15, wherein the joint member comprises at least one biasing member, the at least one biasing member being configured to bias the first body and the second body together.

* * * * *